US009964427B2

(12) United States Patent
Deak et al.

(10) Patent No.: US 9,964,427 B2
(45) Date of Patent: May 8, 2018

(54) LIQUID LEVEL SENSOR SYSTEM

(71) Applicant: MultiDimension Technology Co., Ltd., Zhangjiagang (CN)

(72) Inventors: James Geza Deak, Zhangjiagang (CN); Mark C. Tondra, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 93 days.

(21) Appl. No.: 14/894,271

(22) PCT Filed: May 30, 2014

(86) PCT No.: PCT/CN2014/078997
§ 371 (c)(1),
(2) Date: Nov. 25, 2015

(87) PCT Pub. No.: WO2014/190943
PCT Pub. Date: Dec. 4, 2014

(65) Prior Publication Data
US 2016/0123789 A1 May 5, 2016

(30) Foreign Application Priority Data
May 31, 2013 (CN) .......................... 2013 1 0213351

(51) Int. Cl.
G01F 23/54 (2006.01)
G01F 23/38 (2006.01)

(52) U.S. Cl.
CPC .............. *G01F 23/54* (2013.01); *G01F 23/38* (2013.01); *G01F 23/543* (2013.01)

(58) Field of Classification Search
CPC ....... G01F 23/543; G01F 23/54; G01F 23/546
See application file for complete search history.

(56) References Cited

U.S. PATENT DOCUMENTS 3,709,038 A 1/1973 Werner
5,410,913 A 5/1995 Blackburn
(Continued)

FOREIGN PATENT DOCUMENTS

CN 101509803 8/2009
CN 102297652 12/2011
(Continued)

OTHER PUBLICATIONS

"International Application No. PCT/CN2014/078997, International Search Report dated Jul. 30, 2014", (Jul. 30, 2014), 6 pgs.
(Continued)

Primary Examiner — Paul West
(74) Attorney, Agent, or Firm — Schwegman Lundberg & Woessner, P.A.

(57) ABSTRACT

A liquid level sensor system is disclosed for remotely monitoring the liquid level in a tank. The system comprises a first fixed portion with a first liquid level response unit, and a second fixed portion with a second liquid level response unit. A guide tube is inserted into the tank and attached to the bottom of the first fixed portion. The guide tube is provided with a multitude of ports, such that the liquid level in the guide tube is flush with the liquid level in the tank. The first liquid level response unit comprises a float floating up and down with the variation of the liquid level in the guide tube, a rotating shaft rotating around a relatively fixed axis of rotation in the up and down floating process of the float, and a permanent magnet. The second fixed portion is attached to the top of the first fixed portion. The second liquid level response unit comprises a PCB, a magnetoresistive angle sensor chip, and a control circuit electrically connected to the magnetoresistive angle sensor chip. The magnetoresistive angle sensor chip outputs an analog voltage signal to the control circuit according to the rotation angle of the perma- (Continued)

nent magnet, and the control circuit calculates the height of the liquid level according to the analog voltage signal.

20 Claims, 8 Drawing Sheets

(56) References Cited

U.S. PATENT DOCUMENTS

| | | |
|---|---|---|
| 6,326,781 B1 | 12/2001 | Kunde et al. |
| 2004/0079152 A1* | 4/2004 | Sorenson ................ G01F 23/38 73/313 |
| 2006/0273784 A1 | 12/2006 | Godoy et al. |
| 2010/0156396 A1* | 6/2010 | Moroni ................ H05K 7/1462 324/202 |
| 2011/0251805 A1* | 10/2011 | Plankenhorn .......... G01D 5/145 702/57 |

FOREIGN PATENT DOCUMENTS

| | | |
|---|---|---|
| CN | 103278216 | 9/2013 |
| CN | 203337221 | 12/2013 |
| JP | H11287696 | 10/1999 |
| JP | 2003177051 | 6/2003 |
| WO | WO-2002033364 | 4/2002 |
| WO | WO-2008/120222 | 10/2008 |
| WO | WO-2014/190943 | 12/2014 |

OTHER PUBLICATIONS

"European Application No. 14804604.8, Extended European Search Report dated Dec. 21, 2016", (Dec. 21, 2016), 3 pgs.

* cited by examiner

-- PRIOR ART --

-- PRIOR ART --

-- PRIOR ART --

LIQUID LEVEL SENSOR SYSTEM

PRIORITY CLAIM TO RELATED APPLICATIONS

This application is a U.S. national stage application filed under 35 U.S.C. § 371 from International Application Serial No. PCT/CN2014/078997, which was filed 30 May 2014, and published as WO2014/190943 on 4 Dec. 2014, and which claims priority to China Application No. 201310213351.6, filed 31 May 2013, which applications and publication are incorporated by reference as if reproduced herein and made a part hereof in their entirety, and the benefit of priority of each of which is claimed herein.

TECHNICAL FIELD

The field of the present invention relates to technical innovations in the following: "liquid level sensors", "magnetic angle sensors", and "magnetic rotation sensors", especially involving an application as a liquid level sensor that is able to measure the liquid level in a tank.

BACKGROUND TECHNOLOGY

The present invention follows from some ideas already in the public domain. U.S. Pat. No. 5,410,913, by Blackburn, describes a "Remote Indicating Liquid Level Sensor," and FIG. 1 shows a diagram from this patent. The problem solved by Blackburn is a way to have an electronic readout of a liquid level in a tank without putting electrical components into the tank. This was accomplished by placing a permanent magnet on an apparatus inside the tank, and having electronic magnetic detection outside the tank.

Specifically, the internal permanent magnet is on a bent arm that pivots in a circle as the main shaft twists about its central axis. In this case the permanent magnet rotates around a large diameter, in the range of several cm. The motion of the magnet is detected by an external circular array of 9 magnetic sensors. The sensors are arranged with a regular angular spacing about the circle so that only 1 or 2 sensors are detecting the presence of the magnet at any one time. The magnetic sensors described are magnetic-reed switches. These electrical switches open and close when the magnetic force upon a thin strip of ferromagnetic material is sufficient to bend the strip into contact with a second electrical contact. The magnetic force is generated by the strip's interaction with an externally applied magnetic field. When the field is stronger that a certain threshold level, the strip will bend and close the electrical contact. When the externally applied magnetic field is smaller than said threshold level, the strip will not be bent enough to close the electrical contact.

There are solid state magnetic switches, described in the public domain, that open and close electrically with no physical motion needed. Also in the public domain are magnetic sensors that detect the rotation angle of a shaft.

Also in the prior domain, there are magnetic sensors that count the number of revolutions that a shaft makes about its axis.

The first three figures come directly from U.S. Pat. No. 5,410,913. FIG. 1 shows a cross section of an electronic remote liquid level sensor. This sensor system is placed through a hole at top of a tank, and has electronic connections that are outside the tank cavity. The design allows the tank to be sealed off from the external atmosphere, and to be at a different temperature and pressure than the surroundings. These requirements are determined by the specific application. There are two main parts of the system shown here, assembly A and assembly B. Assembly A is the mechanical socket and assembly is an electronic sensor module. These two assemblies are normally mechanically joined together. Here, they are separated to enable easier viewing and explanation of the drawing.

Assembly A is located at the interface between tank wall 13 and sensor base plate 10. Sensor hole 12 is cut into tank wall 13 to accommodate the level sensing assembly. Guide tube 14 provides a structural support for the vertically extended portion of the level sensing assembly. It has two ports 27, 28 that allow liquid to fill tube cavity 38 so that the liquid level inside guide tube 14 is the same as liquid level 39 in the rest of the tank.

The vertical location of float 15 follows liquid level 39 as it goes up and down along the Z axis 16. We set the origin of our coordinate system to be at the intersection of X axis 8 and Z axis 16; Y axis 9 is into the page and not shown in FIG. 1. This origin is on the top surface of guide tube bottom plate 26. When liquid level 39 is below Z=0, float 15 falls to Z=0 but is prevented from falling further by guide tube bottom plate 26. When liquid level 39 is higher than the height of float 15, the precise amount of float 15 that is above and below liquid level 39 depends on the ratio of their respective specific gravities. So long as the specific gravity of float 15 is smaller than that of the liquid, it will ride on the liquid at a vertical position such that liquid level 39 is between its top and bottom as shown in FIG. 1.

Rigid rotating shaft 19 has permanent magnet 22 affixed to it upper end. It is bent at a right angle so that as radially directed arm 21 rotates about the axis of rotation (Z axis) 16, permanent magnet 22 goes in a circle in groove 30 cut into fixture top plate 29. Shaft hole 24 is cut into sensor mating plate 10 so rigid rotating shaft 19 can pass through. Mechanical support for the weight of rigid rotating shaft 19 is provided by raised ring 25 at the upper end, and the guide tube bottom plate 26 at the lower end. The lower end is allowed to rotate freely about axis of rotation 16. However, no motion along this axis is allowed due to the already described mechanical constraints.

A precise mechanical relationship between the vertical position of float 15 and its angular displacement is maintained by the physical interface between guide tube 14, rigid rotating shaft 19, and float 15. There is a slide-able key interface between float 15 and rigid rotating shaft 19 through the use of key lugs 20 on float 15. There is a slide-able groove—rail interface between float 15 and guide tube 14 through use of guide rails 17 on guide tube 14, and grooves 18 on float 15. Rigid rotating shaft 19 has a twist in it so that the direction normal to its face is changing smoothly as a function of distance Z from the bottom. Twisted rigid shaft upper portion 19' is at a distance $Z_{full}$ from the bottom, and has a normal rotation angle theta full that is selected by the designer to meet the needs of a specific application. In this diagram, it is shown that upper portion 19' is twisted a full 360° from bottom portion of rigid rotating shaft 19. It is not a requirement of the present invention that this twist be exactly 360°; any values are included. Arm 21 carrying permanent magnet 22, points to the angle perpendicular to the normal to upper portion 19'. A general linear relationship between rotation angle of permanent magnet 22, (rigidly rotating with upper portion 19') and liquid level 39 (and therefore the Z location of float 15) can be written.

Use $\theta_{Level}$ as a variable to describe rotation angle 102, and $Z_{Level}$ as a variable to describe the vertical position of liquid level 39; $\theta_{Full}$ and $\theta_{Empty}$ are constants that describe the rotation angle 102 at Full and Empty conditions; $Z_{Full}$ and $Z_{Empty}$, are constants that describe the vertical position of liquid level 39 at full and empty conditions. Then, the linear relationship between $\theta_{Level}$ and $Z_{Level}$ can be written as:

$$\theta_{Level} = \theta_{Empty} + (\theta_{Full} - \theta_{Empty}) * (Z_{Level} - Z_{Empty}) / (Z_{Full} - Z_{Empty}) \quad (1)$$

Solving for $Z_{Level}$:

$$Z_{Level} = Z_{Empty} + (Z_{Full} - Z_{Empty}) * (\theta_{Level} - \theta_{Empty}) / (\theta_{Full} - \theta_{Empty}) \quad (2)$$

Assembly B contains nine magnetic reed switches 41-49 and resistors 61-69, which are mounted on PCB 35. Switches 41-49 are arranged in a circular pattern that is co-axial with the axis of rotation 16, and at a radius such that the magnetic fields from permanent magnet 22 are large enough to trip the switches but only when at or near the same Rotation Angle as a given switch.

Electrical interconnect flexible wires 33, 34, carry electric signals to and from PCB 35. Sensor module top cover 36 and sensor module bottom cover 37 provide protection and mechanical support to PCB 35. Integrally formed snap fingers 31 in Assembly A provide permanent or temporary mechanical engagement to notches 32 in Assembly B.

A top view of sensor base plate 10 and fixture top plate 29 is shown in FIG. 2. Snap fingers 31 are arranged at regular angular intervals about the axis of rotation 16 as are bolt through holes in plate 10. Together, these structural features fix the position of switches 41-49, while permitting permanent magnet 22 to rotate about the axis of rotation 16.

A top view of PCB 35 with its components is shown in FIG. 3. Switches 41-49 are normally open, meaning they do not conduct electrical current under "low magnetic field" conditions; but under high magnetic field conditions they close, which makes their resistance zero. When permanent magnet 22 passes near a specific switch, that switch goes to closed.

Terminals 50-51 are the external electrical points of measurement for the circuit through the use of a simple resistance measurement. Resistors 61-69 are connected electrically in series between terminals 50 and 51. Magnetic reed switches 41-49 each have one end electrically connected to terminal 51 and their other end connected to a contact point between two of resistors 61-69. If none of switches 41-49 are closed, the net measured resistance between terminals 50 and 51, is the sum of all resistors 61-69. If no switches are closed but switch 49, the net measured resistance will be the sum of resistors 61-68. If no switches are closed but switch 48, the net measured resistance will be the sum of resistors 61-67. And this logic works for all switch locations so that as permanent magnet 22 rotates through its path from 0 to 360 degrees, the measured resistance between terminals 50-51 increases in discrete steps as each of switches 41-49 close.

Generally, it is an electronic remote magnetic float-based rotating shaft liquid level sensor system for a tank. The present invention uses the same or similar rigid shaft rotation mechanism, but an improved magnetic sensing system. The next two figures explain the magnetic detection geometry. This is both the position and orientation of magnetic angle sensors and of permanent magnets whose rotation is detected by the angle sensors.

A perspective view and a cross section view of the magnetic angle detection geometry are shown in FIG. 4 showing the positional relationship between the magnetic field angle sensor chip and the permanent magnet. Permanent magnet 105 rotates about the axis of rotation 16 with the rotation direction 101. The magnitude of its rotation is given by rotation angle 102. An electronic magnetoresistive sensor chip is situated on or near the axis of rotation 16. Its internal sensing elements have a designed axis of sensitivity along X axis 8 and Y axis 9. The magnetic field angle sensor chip 103 should be fixed with respect to the detection coordinate axes, and not move when magnet 105 rotates. Magnetic field angle sensor chip 103 is mounted on Printed Circuit Board (PCB) 104. There is a designed separation S 106 between angle sensor chip 103 and the top surface of permanent magnet 105.

Each sensing element in angle sensor chip 103 has 2 output leads for a total of 4 output leads. The voltage between the pair of output leads for the X axis sensor is plotted as curve 110 in FIG. 5. The voltage between the pair of output leads for the Y axis sensor is plotted as curve 111 in FIG. 5. These curves represent the voltage change as a function of the rotation angle 102.

The above described general purpose magnetoresistive rotation sensor is known in the art. For example, Application No. 201110130222.1 and 201110130202.4 are two patents that describe a kind of design for potential applications magnetoresistive sensor element in a magnetic field angle sensor. These patent documents are hereby incorporated into the present application by reference.

However, in the above prior art there are some defects, such as the kind of detection system used to detect the permanent magnet as well as the large diameter guide tube that is needed; also the mechanical magnetic sensors are prone to failure.

SUMMARY OF THE INVENTION

The present invention provides a method that does not only reduce the size and cost of a level sensor system, but it also improves performance.

The present invention provides the following technical solutions to achieve these goals:

A level sensor system, for use in remote monitoring the liquid level in the tank, wherein, the sensor system comprises:

a first fixed portion at the opening of the tank, a guide tube inserted into the tank below the first fixed portion, the guide tube is provided with a multitude of ports to allow the liquid level in the guide tube to be flush with the liquid level in the tank; as well as a first level response unit, comprising:

a float inside the guide tube floating on the surface of the liquid, that moves up and down as the liquid level varies in the guide tube;

a rotating shaft, said rotating shaft mechanically coupled with the float, while the float is in the process of moving up and down, the rotating shaft rotates around the tank's fixed axis of rotation;

a permanent magnet, set at the upper end of the rotating shaft, rotating together with the rotation of the shaft;

a second fixed portion, attached to the top of the first fixed portion;

a second level response element, including a PCB attached to the second fixed portion, a magnetoresistive angle sensor chip attached to the PCB on the side towards the permanent magnet, and the magnetoresistive angle sensor chip is electrically interconnected with a control circuit;

the magnetoresistive angle sensor chip outputs an analog voltage signal to the control circuit according to the angle of rotation of the permanent magnet, and the control circuit calculates the height of the liquid level according to the analog voltage signal.

Preferably, while in the process of the liquid level in the guide tube moving between empty and full, the rotating shaft rotates 360 times n degrees, where n is an integer greater than or equal to 1, the rotation angle of the rotating shaft is linearly proportional to the liquid surface height.

Preferably the magnetoresistive angle sensor chip is comprised of TMR sensor elements.

Preferably, the magnetoresistive angle sensor chip contains two independent sensors, one of which is an X-axis sensor, the other is a Y-axis sensor, where the sensitive axis of the X-axis sensor is the X axis, and the sensitive axis of the Y-axis sensor is Y-axis, wherein the X-axis and Y-axis are located in the same plane, and the angle between the X-axis and the Y-axis is 90°.

Further, during the rotation of the rotating shaft, the stray field produced by the permanent magnet in the sensing plane of the above placed magnetoresistive angle sensor chip has 360 degree symmetry.

Still further, the sensing plane is parallel to the XY plane, and spaced a certain distance from the upper surface of the permanent magnet.

Preferably, the analog output voltage signal is converted to a standard digital signal format; the standard digital signal format is a pulse width modulated signal.

Preferably, the analog output voltage signal is converted to a standard digital signal format; the standard digital signal format is a pulse width modulated signal.

Further, the pulse width modulation of the output is linearly proportional to the angle of rotation of the permanent magnet.

Preferably, there is a separable connection between the first fixed portion and the second fixed portion.

Preferably, the space between the first fixed portion and the tank has an adjustable structure for adjusting the height of the permanent magnet.

Preferably, the first fixed portion has a center hole, the top end of the rotating shaft passes upwardly through the center hole, and the rotating shaft is suspended from the first fixed portion, the first fixed portion also is setup as a pressure tight sealing housing used to isolate the tank from the external environment, the second fixed portion is correspondingly fixed to the pressure tight sealing housing.

Preferably, the control circuit includes a magnetic angle sensor circuit, a power supply circuit, and a signal processing circuit.

Preferably, the sensor system includes a wireless sensor module, the wireless sensor module uses a wireless communication circuit to perform wireless communication, the wireless sensor module obtains power from a battery.

Compared with existing technology, the present invention uses a simpler straight rod magnetic arm to replace the complex bent magnetic arm, which is a more compact magnetic configuration that enables the magnetic field to change smoothly, at a single location where a magnetic angle sensor can detect the angular change of the magnetic field in a position at or near the axis of rotation of the rotating shaft. The present invention uses a single solid-state magnetoresistive sensor to replace the large nine reed switch circular array. The present invention provides a liquid level sensor having a smaller size, simpler control unit, better reliability, higher resolution, and it provides the advantages of an improved electrical communication method.

BRIEF DESCRIPTION OF THE FIGURES

The description of the drawings used are used to provide an improved understanding of the present invention, as part of this application, the implementation embodiments are used to explain the present invention, but they are not intended to limit the present invention. The appended drawings are as follows.

DESCRIPTION OF THE PREFERRED EMBODIMENTS

Example 1

Figure 6:
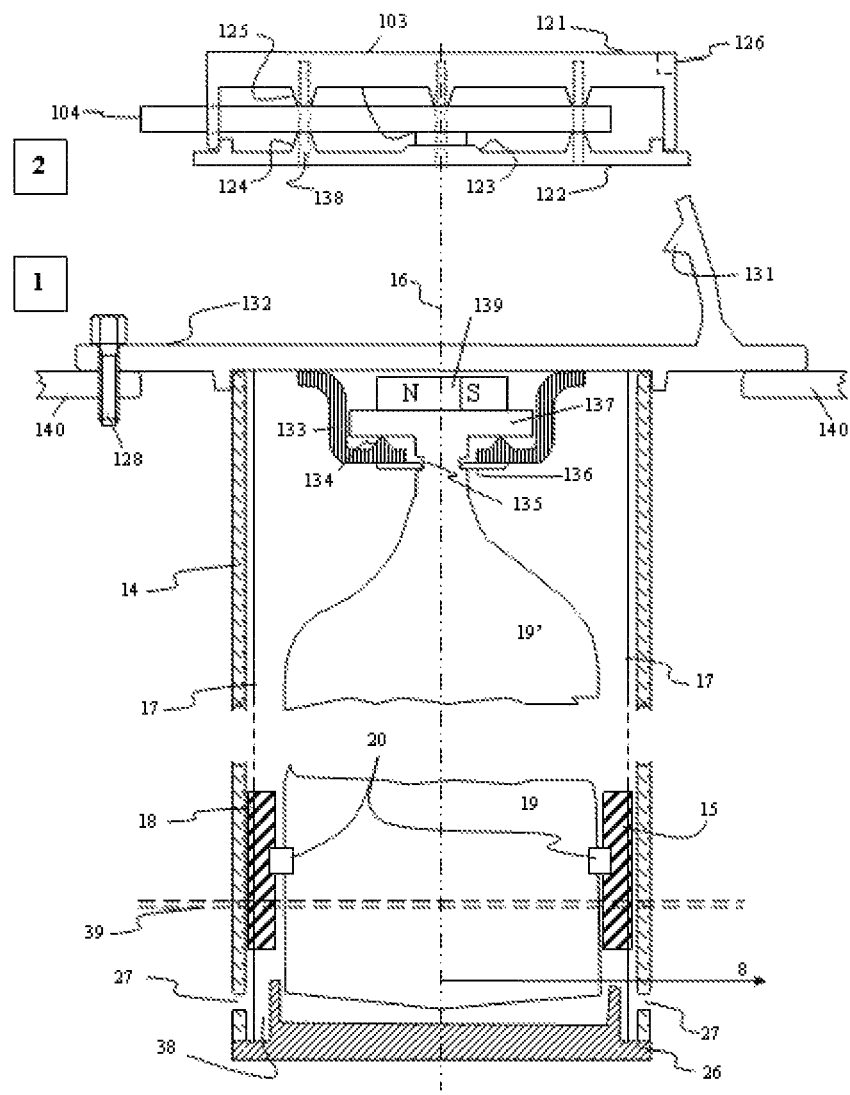
FIG. 6 is a cross-sectional view of the first embodiment of the liquid level sensor system invention.

FIG. 6 is a cross-sectional view of an electronic level sensor remote control system. As shown in FIG. 6, a liquid level sensor system, the sensor system comprises a first fixed portion, a first level response element, a second fixed portion 2 and a second level response unit. This sensor system is placed through a hole at top of a tank, and has electronic connections that are outside the tank cavity. The design allows the tank to be sealed off from the external atmosphere, and to be at a different temperature and pressure than the surroundings. These requirements are determined by the specific application. The figure shows the two main parts of the system, the lower half of the figure is for fixed portion 1 and a first level response element, the upper half is for fixed portion 2 and the second level response element. The two parts are normally mechanically connected together, in this figure they are shown separately, in order to facilitate the observation and interpretation.

First fixed portion 1 is attached at the opening of the tank. Specifically, in the present embodiment, first fixed portion 1 comprises a finger-shaped latch 131 and top flange 132. The top flange 132 and the vessel wall 140 are connected using bolts 128. Of course, alternative fastening methods such as gluing and welding the first fixed element 1 are within the scope of this invention.

Figure 1:
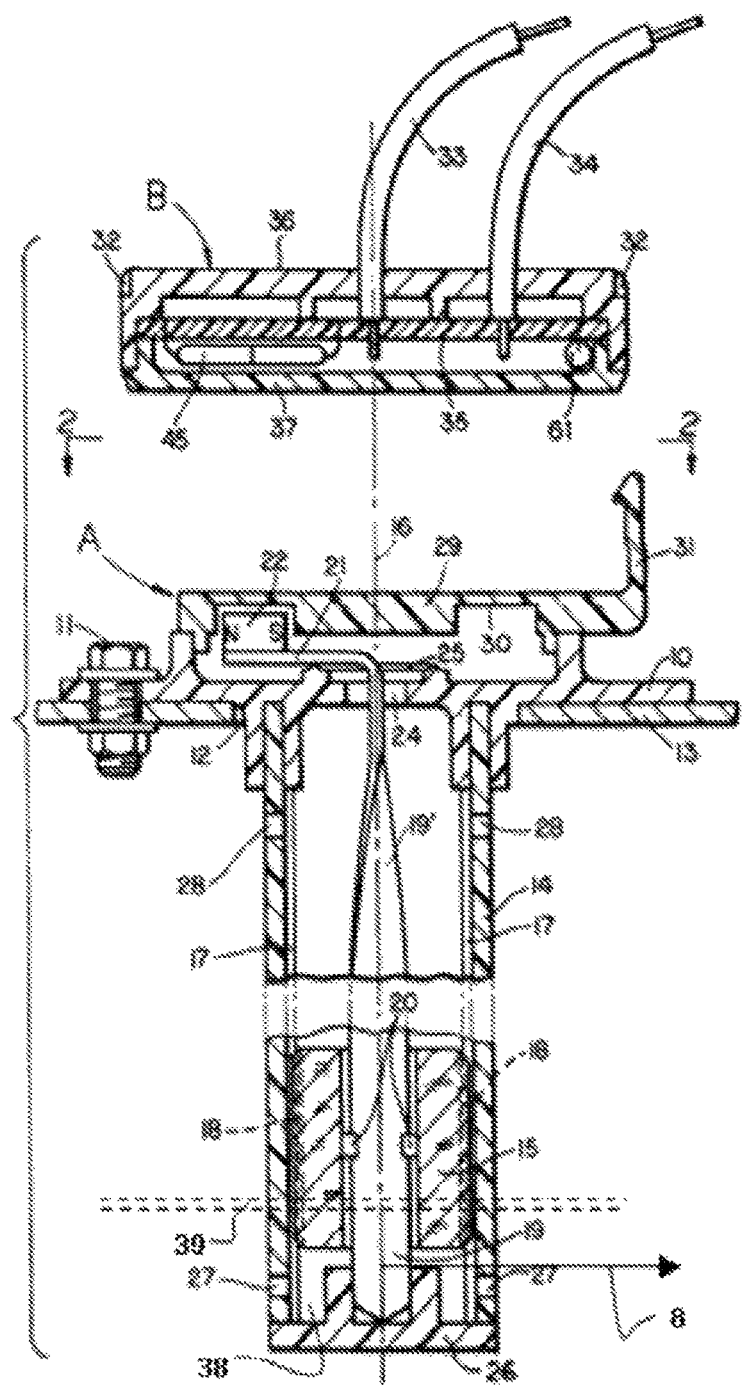
FIG. 1 is a Cross section of a remote magnetic float-based rotating shaft liquid level sensor system in the Prior Art from U.S. Pat. No. 5,410,913.
Figure 2:
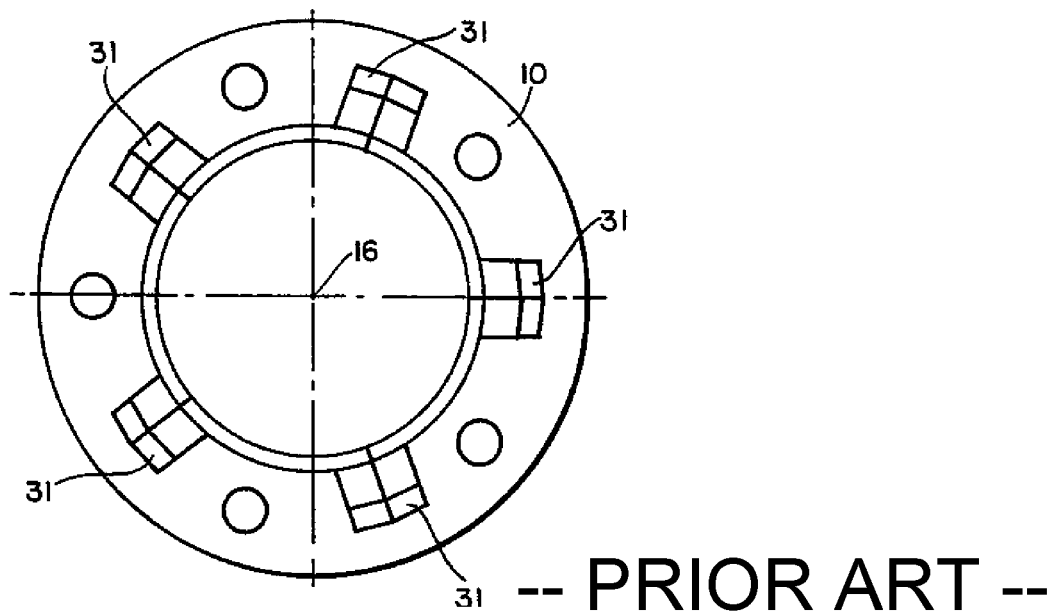
FIG. 2 is a top-down view of part A in FIG. 1.
Figure 3:
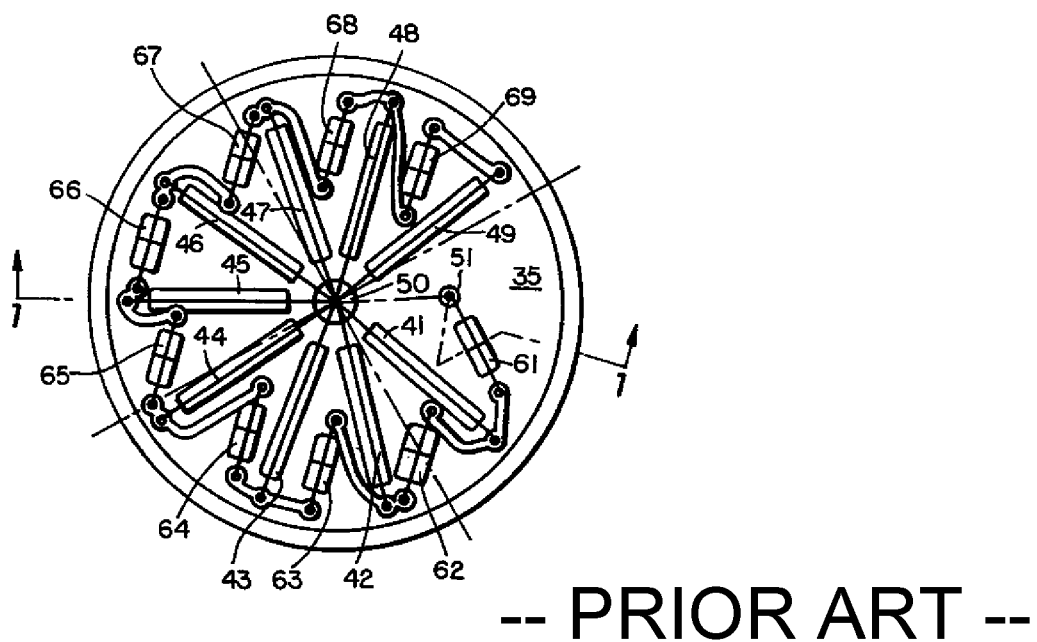
FIG. 3 is a top-down view of part B in FIG. 1.

The bottom of first fixed portion 1 is attached to guide tube 14; guide tube 14 provides a structural support for the vertically extended portion of the level sensing assembly. In this embodiment the guide tube 14 has ports 27, 28 that allow liquid to fill tube cavity 38 so that the liquid level inside guide tube 14 is the same as liquid level 39 in the rest of the tank. It is also possible to open the same type of ports 28 in guide tube 14 as illustrated in FIG. 1, but this configuration is not shown in FIG. 6.

The first level response unit includes components float 15, rotating shaft 19, and permanent magnet 139. In this invention rotating shaft 19 that is mentioned above can consist of a rigid rotating shaft 19, the float 15 inside the guide tube moves up and down with the surface of the liquid. Rotating shaft 19 is mechanically coupled with float 15 through sliding tab 20, while the float 15 is in the process of moving up an down, the rotating shaft 19 revolves around the axis of rotation 16 of the tank, permanent magnet 139 installed on the rotating shaft 19 rotates together with rotating shaft 19. When the liquid level 39 is in the process of changing from empty to full, rotating shaft 19 rotates 360 times n degrees, where n is an integer greater than or equal to 1. Liquid level 39 and the rotation angle of rotating shaft 19 have a linearly proportional relationship. For example, when the tank is empty, that is, level 39 is 0%, the rotation angle of the rotating shaft 19 is 0 degree; when the liquid level is 50%, the rotation angle of the rotating shaft 19 is 180 degrees, when the tank is full, that is, liquid level 39 is 100 percent, the rotation angle of the rotating shaft 19 is 360 degrees.

Specifically, in the present embodiment, rotating shaft 19 has a plate 137 attached at its upper end. The weight and other forces applied by the top plate 137, rotating shaft 19' and all other attached material is supported by support ring 134, which is a pointed raised part of ribbon support 133. Permanent magnet 139 is affixed to the top face of top plate 137. Snap ring groove 135 and snap ring 136 provide a mechanical restraint on upward motion of rotating shaft 19. When the float 15 moves up and down, it turns rotating shaft 19 about axis of rotation 16, and permanent magnet 139 rotates about the axis of rotation 16, at the same angular rate as rotating shaft 19. The lower end is allowed to rotate freely about axis of rotation 16. However, no motion along this axis of rotating shaft 19 is allowed due to the already described mechanical constraints. The relationship between, the orientation of the face of rotating shaft 19, and the vertical location liquid of level 39, of float 15, and the guide tab 17, and groove 135 are the same as for the mechanical design of FIG. 1. In the implementation of the prior art in FIG. 1 equation 1 describes the linear relationship between $\theta_{Level}$ and $Z_{Level}$ that applies to this case.

The second fixed portion 2 is located above the first fixed portion 1, and the second fixed portion 2 is correspondingly attached to the first fixed portion 1. In the present embodiment, the first fixed portion 1 is formed with a flange 132 extending upwardly relative to the finger-spring lock 131, the second fixed portion 2 is provided with a finger spring lock 131 corresponding to the notches 126. This design can be implemented in such a way that the second fixed portion 2 may be removed from the first fixed portion 1. Permanent or temporary fixed adhesive bonding may be used between the first fixed portion 1 and the second fixed portion 2, depending on the actual needs.

In the present embodiment, the second fixed portion 2 includes a top plate 121 and bottom plate 122. In the top plate 121 surface there is provided a notch 126, passing through notch 126, the top plate 121 is finger-shaped latch 131. Through alignment holes 138 in the top plate 121, PCB 104 and the bottom plate 122 fixed together. The top plate 121 alignment holes are threaded, but the screws are not shown in the figure. If they are intended to be permanently attached, then the threaded holes ought to be into the top of flange 132, and the top alignment holes in top plate 121 and bottom plate 122 ought to be through holes. Through the use of a retention clip PCB 104 may be removed from second fixed portion 2, but the figure does not show the retention clip or the permanent attachment method methods.

In bottom plate 122 a multitude of upwardly pointing protrusions are provided, these are intended for use with the magnetoresistive angle sensor chip 103 support structure 123, and used for PCB 104 support structure 124. In top plate 121 there are a multitude of downward pointing protrusions, these are included for use as support structures 125 for holding the PCB 104. The three support structures stop the PCB 104 from rotating or tilting, in addition preventing the magnetoresistive angle sensors from vibrating or moving with respect to the permanent magnet. This helps to avoid error signals produced by the magnetoresistive angle sensor chip.

Connection of these components using other methods is also included within the scope of the invention. These methods include: automated gluing, riveting, plastic injection molding, and also other standard public domain electronic packaging methods. The essential functions of these fixing methods are: 1) retain the magnetoresistive sensor chip 103 in its proper location on the axis of rotation 16 and at designed separation distance S 106; 2) enable electrical power connections; 3) enable data communication connections, 4) preserve the magnetic rotation sensor environment. Choice of materials for these components, potting materials, and fasteners needs to fit 2 sets of criteria: magnetic compatibility, and optional visual clarity (one can use a visual inspection of the rotation of a feature, line, or mark on the top side or ribbon top plate 137, and/or permanent magnet 139, as a secondary measurement method, and calibration technique if the application requires these).

The top plate 121 may be a ferromagnetic material such as soft magnetic steel or the like, in order to provide a "magnetic shield" between magnetoresistive angle sensor 103 and any sources of magnetic field outside second fixed portion 2.

Preferably, a magnetic shield may additionally be added (not shown) on top of the top plate 121, such an approach does not change the important properties of the magnetoresistive angle sensor chip 103, but it is better able to provide a "magnetic shield" between the sensor chip 103 and sources exterior to second fixed portion 2. All the other parts of second fixed portion 2, and top flange 132 should be non-magnetic metal, plastic, wood, glass, ceramic, polymer, etc.

If the visual reading option is selected, clear materials must be chosen for all the layers above permanent magnet 139, and a hole can be made in sensor PCB 104 that allows visual access (not shown).

The second level responsive element includes a printed circuit board PCB 104 mounted onto the second fixed portion, disposed on the PCB 104 is a magnetoresistive angle sensor 103 on the side closest to the permanent magnet 139. Preferably, the magnetoresistive angle sensors are TMR sensor elements, and a rotation angle control circuit that calculates the fluid level in the tank based on the analog voltage signal produced in accordance with the permanent magnet 139 rotation angle.

Figure 7:
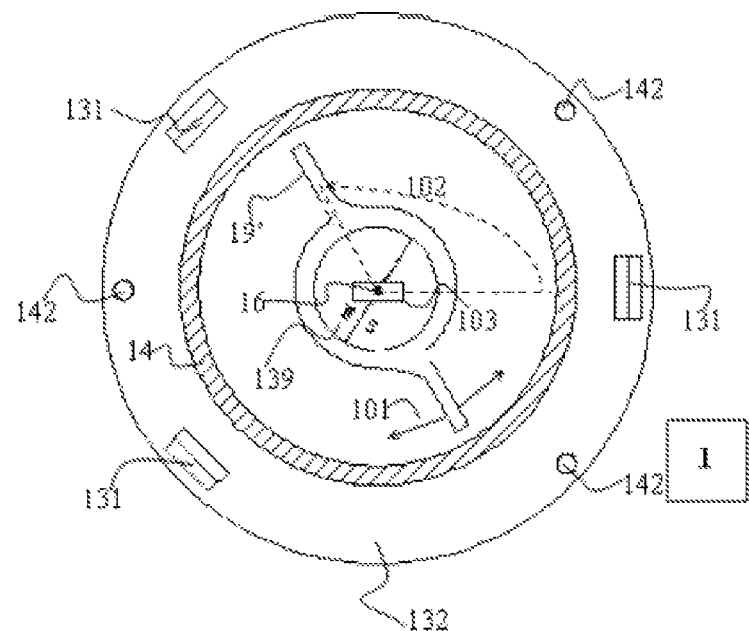
FIG. 7 is a top view of apparatus 1 of FIG. 6.

FIG. 7 shows the second fixed portion 2 removed and a top-view of the second level response element. It shows the angular position θ 102 of rigid rotating shaft 19 and permanent magnet 139, that have angular rotation direction 101 about the axis of rotation 16. Magnetic field angle sensor chip 103 does not rotate. Top flange mounting holes 142 are provided to fasten top flange 132 to tank wall 140 using bolts 128.

Figure 8:
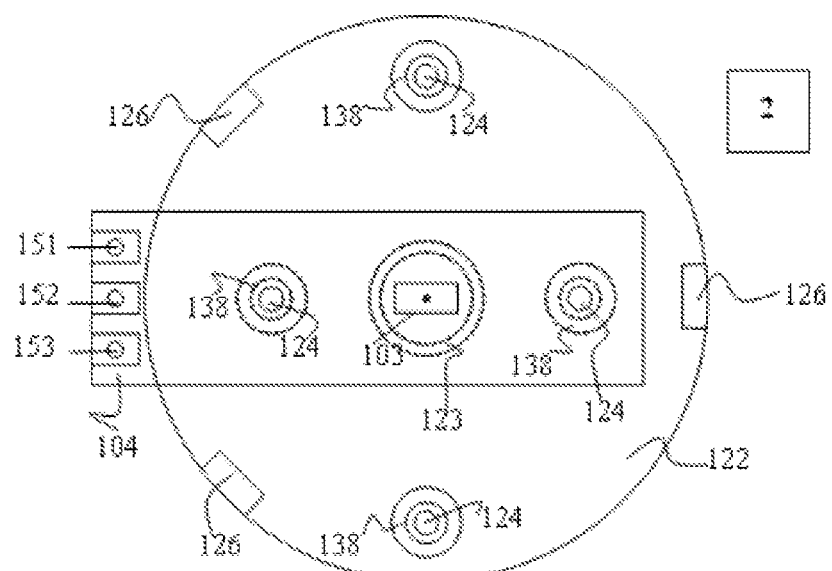
FIG. 8 is a top view of apparatus 2 of FIG. 6.

FIG. 8 shows a top view of some parts of second fixed portion 2 and the second level response unit. The circular outline of sensor module bottom plate 122 is shown in the figure. Sensor module top plate 121 is not shown at all except for notches 126 that line up with snap fingers 131. The rectangular outline of top side of sensor PCB 104 is shown entirely. Key features include alignment holes 138 and angle sensor chip 103. Electrical interconnects to sensor PCB 104 are at the left end. They include electrical contact points $V_{CC}$ 151, Signal 152, and Ground 153. These electrical contact points can have flexible conductive wires soldered to them, a standard card edge connector can slide over the end, or a spring loaded clamp connectors can clip on to the end of PCB 104. Mechanical support for PCB 104 is provided by raised PCB bottom support 124. Sensor 103 is supported by raised sensor support 123.

Example 2

Figure 12:
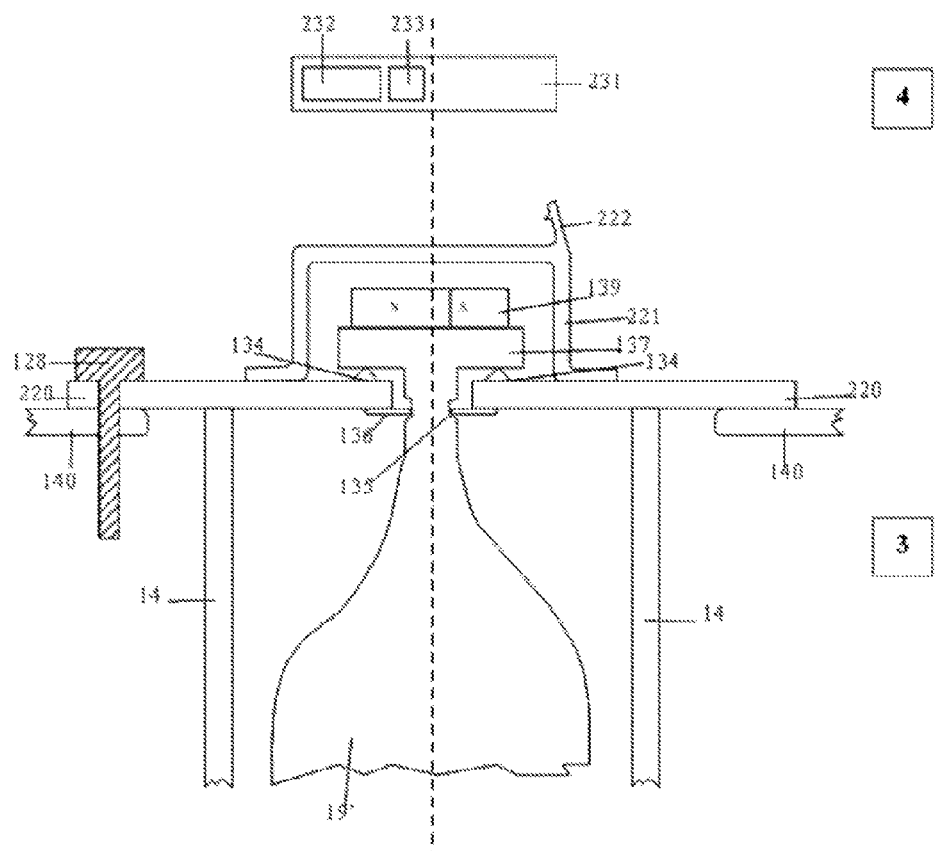
FIG. 12 is a schematic cross-sectional view of a second embodiment of the liquid level sensor system of the present invention.

In the first embodiment, as shown in FIG. 6, and there are no holes in top flange 132 of first fixed unit 1 except if some are used for bolting to tank wall 140. In the present embodiment, A central hole is placed in assembly top flange 220 through which the narrow neck of rigid rotating shaft 19 passes, and the rotating shaft 19 is suspended on flange 220, as shown in FIG. 12. The flange 220 is provided with a sealed housing 221 for isolating the tank from the external environment, a second fixed portion 4 and the seal housing 221 have a fixed connection. Specifically, setting the sealed housing 221 has a finger-shaped tab 222, the second fixed portion 4 on the surface 222 with the finger shaped tab 221 engaging corresponding notches. Support ring 134 is moved up to be on top of assembly top flange 220, where it supports the weight and other forces applied by ribbon top plate 137. Snap ring grooves 135 and snap ring 136 are the same as in FIG. 6. Other components not shown in the figure are the same as in FIG. 6.

Example 3

For the liquid level sensor signal to be used in a higher level system, it must have a way to communicate with the higher level system. It may also reduce the raw analog signal from the magnetic field angle sensor to a form that can be used by digital electronics. The mode of communication between sensor system and higher level system can be on a set of wires, a data bus ($I^2C$, RS232, IEEE 488, Ethernet, USB, and similar), or a wireless link (WiFi, Bluetooth, IoT, etc.). The choice here is determined by the communication protocol that is selected by the user. Alternatively, the communication can be a visual signal such as an LED display that can be read by a person in the same room as the tank. Certainly, a liquid level sensor that uses a combination of these communication methods, and others like them, is within the scope of the present invention.

Figure 9:
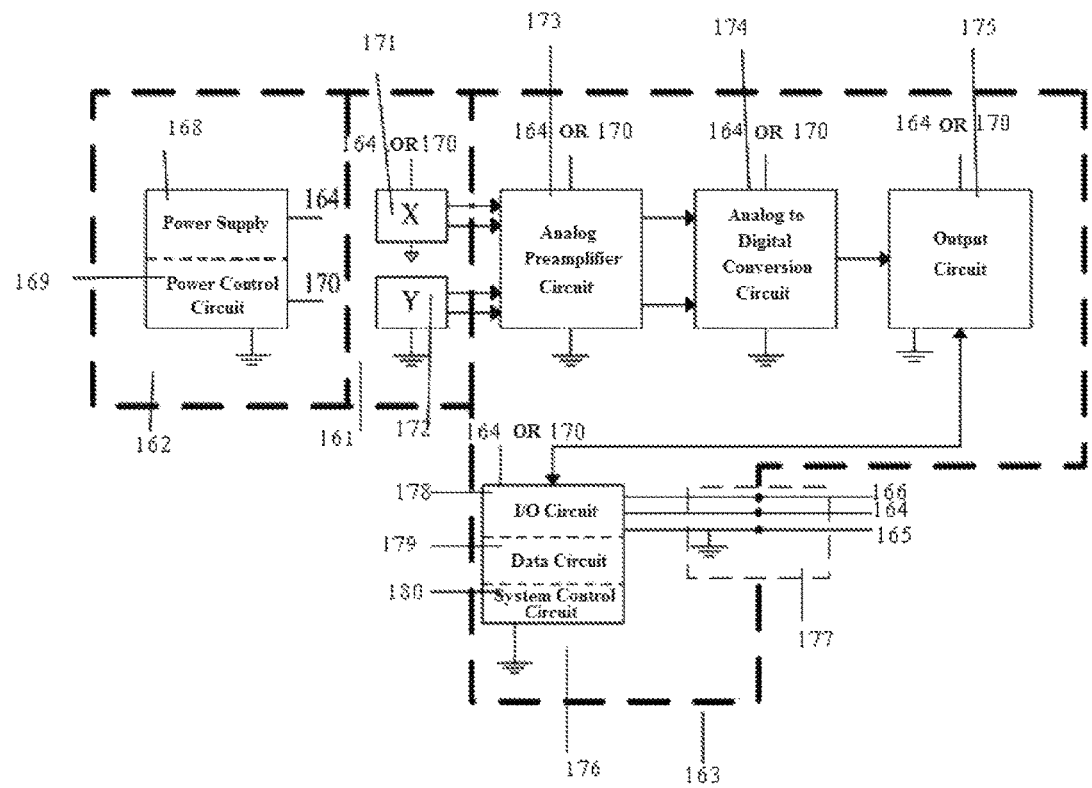
FIG. 9 is a block diagram of the circuit for magnetic angle and rotation sensors.

A block diagram for higher level circuit implementation of the inventive magnetic remote liquid level sensor is shown in FIG. 9. The control circuit has three major circuit blocks, and each has one or more sub-circuits. The three major blocks are: a magnetic field angle transducer circuit 161, a power supply circuit 162, and a signal processing circuit 163. It should be stated that this specific choice for dividing the circuit into sub-circuits is not definitive and does not limit the scope of the invention. Rather, it provides a way to more easily explain the invention and its many parts.

Figure 4:
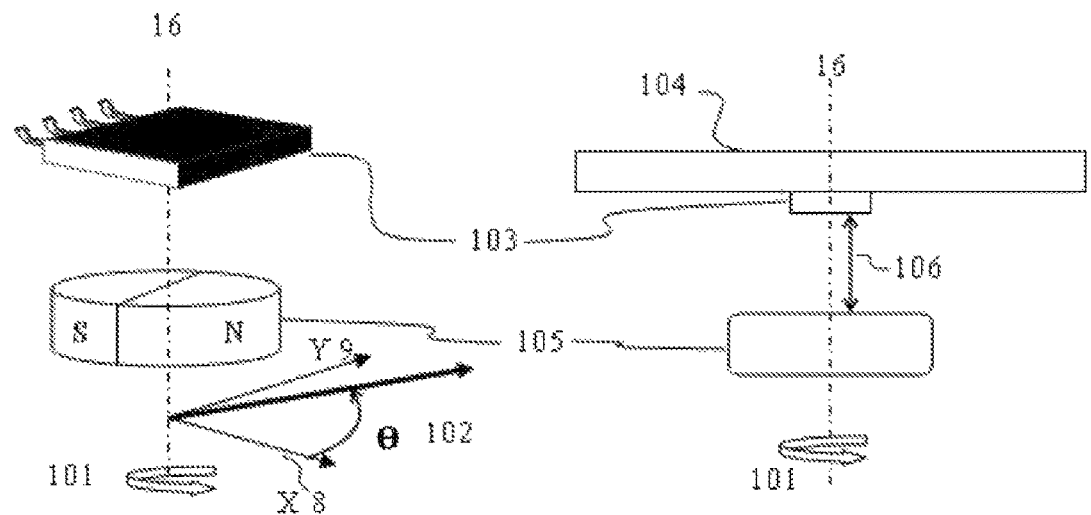
FIG. 4 is a perspective view and a cross-sectional view illustrating the positional relationship between the magnetic field angle sensor and the permanent magnet.

Magnetic angle sensor circuit 161 is electrically connected to magnetoresistive angle sensor chip 103, the chip includes an X-axis magnetoresistive sensor 171 and a Y-axis magnetoresistive angle sensor 172, the X-axis magnetic angle sensor has its sensing axis along the X-axis, the Y-axis magnetic angle sensor has its sensing axis along the Y-axis, and the X-axis and the Y-axis are located in the same plane, and they have an angle of 90 degrees between them. These two sensors sense parallel to the XY plane, the sensing plane is set at a certain distance from permanent magnet 139, FIG. 4 shows this distance as S 106. The output response of these two sensors is shown as curves 110 and 11 in FIG. 5. Magnetic angle sensor circuit 161 has two sub-circuits: One provided for the X-axis magnetoresistive sensor 171 and one provided for the Y-axis magnetoresistive sensor 172, and one end of them is connected to $V_{cc}$ 164 or $V_{Ref}$ 170, and the other end of the X-axis magnetoresistive sensor 171 and the Y-axis magnetoresistive sensor 172 is connected to the ground terminal 166.

The power circuit 162 has the function of taking in electrical energy from a source, and distributing that electrical energy to other parts of the circuit in an efficient and electrically quiet way. There are two sub-circuits, Power 168, and Power regulator circuit 169. The output of power regulator circuit is $V_{Ref}$ 164. Typically, the voltage level of $V_{Ref}$ is lower than that of the input power $V_{CC}$. It is also less noisy if some filters have been used. Since different parts of the entire circuit need different supply voltages, sometime there are several different voltage regulator sub-circuits that provide appropriate power to the sub-circuits.

The signal processing circuit 163 has many functions. A quick summary is that communication protocol 177 has defined ways of receiving information from the sensor system. The signal processing circuit 163 must take raw voltage signals from magnetic angle transducer circuit 161 and convert it to an acceptable format. The first sub-circuit is analog pre-amplifier circuit 173. This circuit multiplies the value of the signal by a designed amount, and has electrical filters that help remove un-wanted signals. The second sub-circuit is the analog to digital converter circuit 174. This circuit takes amplified analog signals from the output of pre-amplifier 173 (expressed in units of VOLTS or AMPS) and converts them to a digital value (expressed in units of BITS). The next sub-circuit, output formatting circuit 175, contains digital circuits and algorithms that convert the digital value produced by the analog to digital convertor circuit 174 into a value and format that is acceptable to the communications protocol 177. The next sub-circuit, microcontroller circuit 176, handles: communication with communication protocol 177 through input/output circuit 178 (also called digital interface circuit); storing and retrieving digital data in data circuit 179, and system control circuit 180 that sends signals to other sub-circuits of the system. The output signal of the circuit is present at $V_{OUTPUT}$ 165.

Example 4

A simple circuit method to obtain the liquid level $Z_{Level}$ from the measured analog X and Y sensor signals from is as follows. Recalling equation (2), we have $$Z_{Level}=Z_{Empty}(Z_{Full}-Z_{Empty})*(\theta_{Level}-\theta_{Empty})/(\theta_{Full}-\theta_{Empty}). \qquad (2)$$

Figure 5:
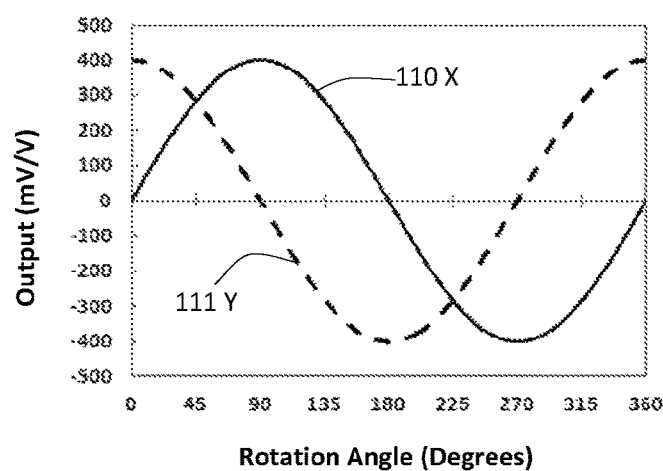
FIG. 5 is a plot of the sensor analog output voltage versus rotation angle for X and Y sensors.

Note that curves in FIG. 5, X 110 and Y 111, have the symmetry of $\sin(\theta_{Level})$ and $\cos(\theta_{Level})$, respectively. So one can monitor the two sets of analog voltage output of magnetic field angle sensor 103, and convert those values into a value for $\theta_{Level}$ by inspection or automated lookup table. Then, use equation (2) to obtain $Z_{Level}$ from $\theta_{Level}$.

Because X-axis magnetic sensor and Y-axis magnetic sensor are used to produce analog voltage signals according to the rotation angle of permanent magnet 139, therefore the output signals represent the status of the magnetic field produced by permanent magnet 139. From FIG. 5 curves 110 and 111 we can see, the stray magnetic field produced by the permanent magnet in the sensing plane has components with 360°, so the permanent magnet may rotate 360°, and the stray field total amplitude value does not change, although the orientation may change.

Example 5

In this embodiment of the present invention, the output signal format is a pulse width modulation format, which uses only three electrical connections: the power supply $V_{CC}$ 164, the signal output 165, and a ground GND 166. These terminals respectively are connected with pads 151, 152, and 153 on PCB 104.

Figure 10:
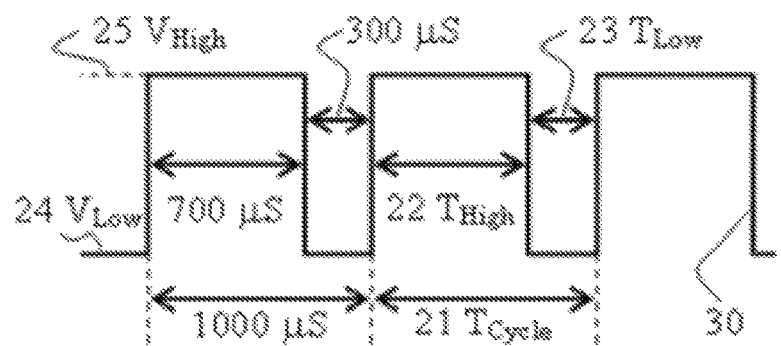
FIG. 10 is a plot of the pulse width modulated signal used for pulse width modulation output.

A liquid level detection system with a digitally processed output is described in this embodiment. Here, the two linear voltage outputs shown as curves 110 and 111 are converted to a single digital wave form. This waveform is shown in the lower left part of FIG. 10 as Waveform 30. This curve represents a voltage vs. time signal, Time being along the horizontal axis. Waveform 30 is a repeating function with a fixed cycle time of 21, $T_{Cycle}$. The voltage of Waveform 30 is either at value 24 $V_{Low}$, or 25 $V_{High}$. Each cycle of Waveform 30 has some time 22 $T_{High}$ spent at 25 $V_{High}$ and some time 23 $T_{Low}$ spent at 24 $V_{Low}$. In FIG. 10, $T_{High}$ and $T_{Low}$ are shown as being 700 microseconds and 300 microseconds, $T_{Cycle}$ 21 is 1000 microseconds. The mathematical ratio of $T_{High}$ 22 to $T_{Cycle}$ 21 is called the "Output Duty Cycle" and is expressed as a percentage (%). In the Waveform 30 shown here, the output duty cycle is (700/1000)= 70%.

Figure 11:
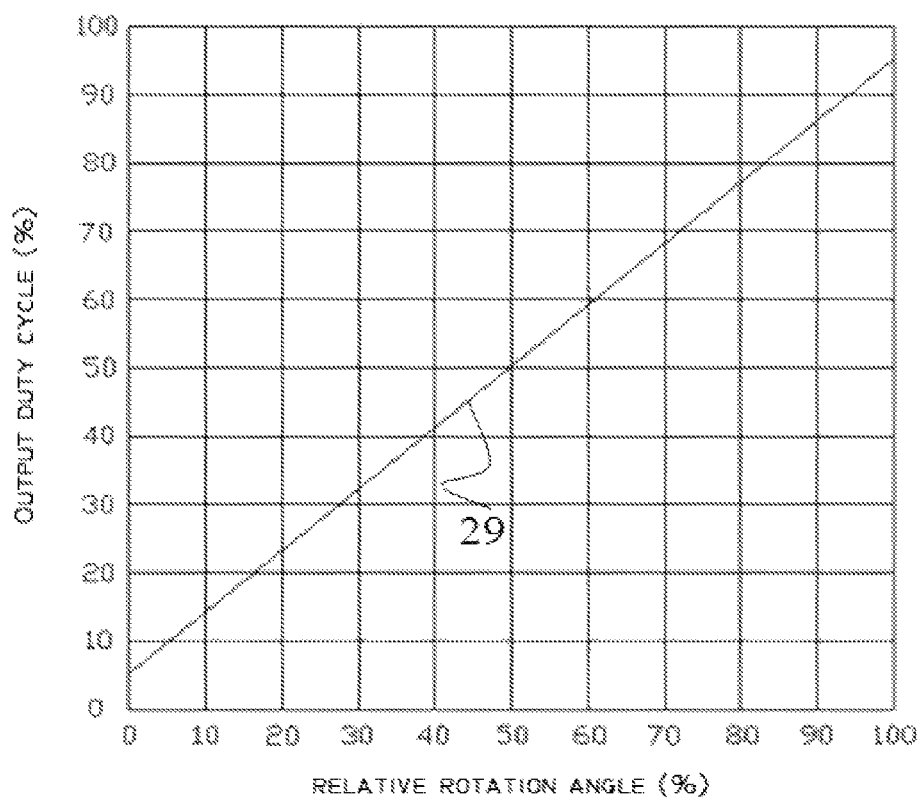
FIG. 11 is a plot showing the relationship between the duty cycle of the PWM waveform as a function of the rotation angle ratio.

A custom designed circuit and program is used to convert the two sine wave shape input from Curves 110 and 111 into Curve 29 shown in FIG. 11. This plot is of output duty cycle (%) vs. rotation angle ratio (%). It is equivalent to output duty cycle (%) vs. liquid level (%) due to the linear relationship between $\theta_{Level}$ and $Z_{Level}$. This scheme as shown in FIGS. 10 and 11 is called Pulse Width Modulation (PWM). It is an output style known in the art. Many digital algorithms are available for decoding the output duty cycle into whatever variable is being indicated. So, PWM is a method to change an irregular analog signal of arbitrary amplitude and shape into a regular digital waveform with standard characteristics.

The circuit that contains magnetoresistive angle sensor chip 103 and the related power and control electronics for controlling the device, and these control circuits are built upon PCB 104 in the way known in the art. A top view of PCB 104 and a superimposed view of the axis of rotation 16, and Paddle 19', are shown in FIG. 7 and FIG. 8. External power and signal connections are made at the lower end of PCB 104 at contact pads 151, 152, and 153, which are connections for pulse width modulated (PWM) output, power, and ground, respectively. As paddle 19' rotates from the 0° position to the 324° position, PWM voltage output between contacts 152 and 153 follows the curve 29 shown in FIG. 11. In this example, the rotation is prevented from going beyond 360 degrees by design.

Example 6

As shown in FIG. 12, the sensor module 231 does not show an output connection, it draws power from the battery 232, and it uses wireless module 233 to communicate via the communication protocol 177.

The foregoing presents preferred embodiments of the present invention, but it does not limit the invention. For technical personnel skilled in the art, the present invention can be made to have various modifications and changes. Any changes, equivalent replacements, or improvements, within spirit and principles of the present invention, should be included within the scope of the present invention.

The invention claimed is:

1. A level sensor system, for use in remote monitoring the liquid level in a tank, wherein, the sensor system comprises:
    a first fixed portion installed at the opening of the tank, a guide tube inserted into the tank below the first fixed portion, the guide tube is provided with a multitude of ports to allow the liquid level in the guide tube to be flush with the liquid level in the tank; and
    a first level response unit, comprising:
    a float inside the guide tube floating on the surface of the liquid, that moves up and down as the liquid level varies in the guide tube;
    a rotating shaft, said rotating shaft mechanically coupled with the float, such that when the float is in the process of moving up and down, the rotating shaft rotates around a fixed axis of rotation;
    a permanent magnet, set at the upper end of the rotating shaft, rotating together with the rotating shaft;
    a second fixed portion, attached to the first fixed portion and located on the upper side of the first fixed portion;
    a second level response element, including a PCB attached to the second fixed portion, a single magnetoresistive angle sensor chip attached to the PCB on the side towards the permanent magnet, and the magnetoresistive angle sensor chip is electrically interconnected with a control circuit; and
    the magnetoresistive angle sensor chip outputs an analog voltage signal to the control circuit according to the angle of rotation of the permanent magnet, and the control circuit calculates the height of the liquid level according to the analog voltage signal; and
    a single magnetic shield between the single magnetoresistive angle sensor chip and magnetic fields outside a structure formed when the second fixed portion is attached to the first fixed portion, wherein the second fixed portion is between the single magnetic shield and the single magnetoresistive sensor chip.

2. The sensor system according to claim 1, wherein the permanent magnet produces a stray field in a sensing plane of the magnetoresistive angle sensor chip that has 360 degree symmetry during rotation of the rotating shaft.

3. The sensor system according to claim 1, wherein the magnetoresistive angle sensor chip is comprised of TMR sensor elements.

4. The sensor system according to claim 1, wherein said magnetoresistive angle sensor chip contains two independent sensors, one of which is an X-axis sensor, the other is a Y-axis sensor, where the sensitive axis of the X-axis sensor is the X axis, and the sensitive axis of the Y-axis sensor is Y-axis, wherein the X-axis and Y-axis are located in the same plane, and the angle between the X-axis and the Y-axis is 90°.

5. The sensor system according to claim 4, wherein during the rotation of the rotating shaft, the stray field produced by the permanent magnet in the sensing plane of the above placed magnetoresistive angle sensor chip has 360 degree symmetry.

6. The sensor system according to claim 5, wherein the sensing plane is parallel to the XY plane, and spaced a certain distance from the upper surface of the permanent magnet.

7. The sensor system according to claim 1, wherein the magnetoresistive sensor's analog voltage output signal is a single-valued function of the angle of rotation of the permanent magnet.

8. The sensor system according to claim 1, wherein the analog output voltage signal is converted to a standard digital signal format; and
   wherein the standard digital signal format is a pulse width modulated signal.

9. The sensor system according to claim 8, wherein the pulse width modulation of the output signal is linearly proportional to the angle of rotation of the permanent magnet.

10. The sensor system according to claim 1, wherein there is a separable connection between the first fixed portion and the second fixed portion.

11. The sensor system according to claim 1, wherein the space between the first fixed portion and the tank has an adjustable structure for adjusting the height of the permanent magnet.

12. The sensor system according to claim 1, wherein the first fixed portion has a center hole, the top end of the rotating shaft passes upwardly through the center hole, and the rotating shaft is suspended from the first fixed portion, and wherein the first fixed portion also is setup as a pressure tight sealing housing used to isolate the tank from the external environment, and wherein the second fixed portion is correspondingly attached to the pressure tight sealing housing.

13. The sensor system according to claim 1, wherein the control circuit includes a magnetic angle sensor circuit, a power supply circuit, and a signal processing circuit.

14. The sensor system according to claim 1, wherein the sensor system includes a wireless sensor module, the wireless sensor module uses a wireless communication circuit to perform wireless communication, and the wireless sensor module obtains power from a battery.

15. The sensor system according to claim 1, wherein the second fixed portion includes a ferromagnetic top plate, the magnetic shield including the ferromagnetic top plate.

16. The sensor system according to claim 1, wherein the second fixed portion includes a top plate, and the magnetic shield is on top of the top plate.

17. A level sensor system, for use in remote monitoring the liquid level in a tank, wherein, the sensor system comprises:
   a first fixed portion installed at the opening of the tank, a guide tube inserted into the tank below the first fixed portion, the guide tube is provided with a multitude of ports to allow the liquid level in the guide tube to be flush with the liquid level in the tank; and
   a first level response unit, comprising:
   a float inside the guide tube floating on the surface of the liquid, that moves up and down as the liquid level varies in the guide tube;
   a rotating shaft, said rotating shaft mechanically coupled with the float, such that when the float is in the process of moving up and down, the rotating shaft rotates around a fixed axis of rotation;
   a permanent magnet, set at the upper end of the rotating shaft, rotating together with the rotating shaft;
   a second fixed portion, attached to the first fixed portion and located on the upper side of the first fixed portion;
   a second level response element, including a PCB attached to the second fixed portion, a single magnetoresistive angle sensor chip attached to the PCB on the side towards the permanent magnet, and the magnetoresistive angle sensor chip is electrically interconnected with a control circuit, wherein the PCB is between the first and second fixed portions, and the magnetoresistive angle chip is between the PCB and the first fixed portion; and
   the single magnetoresistive angle sensor chip outputs an analog voltage signal to the control circuit according to the angle of rotation of the permanent magnet, and the control circuit calculates the height of the liquid level according to the analog voltage signal;
   a single magnetic shield between the single magnetoresistive angle sensor chip and magnetic fields outside a structure formed when the second fixed portion is attached to the first fixed portion, wherein the second fixed portion is between the single magnetic shield and the single magnetoresistive sensor chip;
   the magnetoresistive angle sensor chip including an X-axis sensor and a Y-axis sensor, and during the rotation of the rotating shaft, the stray field produced by the permanent magnet in a sensing plane of the above placed magnetoresistive angle sensor chip has 360 degree symmetry, the sensing plane being parallel to the XY plane, and spaced a distance from an upper surface of the permanent magnet.

18. The sensor system according to claim 17, wherein the analog voltage signal is a single-valued function of the angle of rotation of the permanent magnet.

19. The sensor system according to claim 17, wherein the second fixed portion includes a ferromagnetic top plate, the magnetic shield including the ferromagnetic top plate.

20. The sensor system according to claim 17, wherein the second fixed portion includes a top plate, and the magnetic shield is on top of the top plate.

* * * * *

UNITED STATES PATENT AND TRADEMARK OFFICE
CERTIFICATE OF CORRECTION

| | |
|---|---|
| PATENT NO. | : 9,964,427 B2 |
| APPLICATION NO. | : 14/894271 |
| DATED | : May 8, 2018 |
| INVENTOR(S) | : Deak et al. |

Page 1 of 1

It is certified that error appears in the above-identified patent and that said Letters Patent is hereby corrected as shown below:

On the Title Page

In item (30), in "Foreign Application Priority Data", in Column 1, Line 1, delete "2013 1 0213351" and insert --201310213351.6-- therefor In the Claims In Column 12, Line 62, in Claim 4, delete "X axis," and insert --X-axis,-- therefor Signed and Sealed this
Twenty-eighth Day of May, 2019

Andrei Iancu
*Director of the United States Patent and Trademark Office*